United States Patent
Montague et al.

[19]

[11] Patent Number: 5,975,551
[45] Date of Patent: Nov. 2, 1999

[54] FOLDING FRAME BICYCLE

[75] Inventors: David G. Montague, Newton, Mass.; Harry D. Montague, Washington, D.C.

[73] Assignee: Montague Corporation, Cambridge, Mass.

[21] Appl. No.: 08/896,907

[22] Filed: Jul. 18, 1997

[51] Int. Cl.⁶ .............................. B62K 3/02; B62K 3/14
[52] U.S. Cl. ..................... 280/287; 280/231; 280/278; 180/220
[58] Field of Search ................... 280/287, 278, 280/230, 231; 180/220

[56] References Cited

U.S. PATENT DOCUMENTS

| | | | |
|---|---|---|---|
| 518,330 | 4/1894 | Ryan | 280/261 |
| 569,354 | 10/1896 | Ryan | 280/287 |
| 613,244 | 11/1898 | Chrisman | 280/260 |
| 4,067,589 | 1/1978 | Hon . | |
| 4,182,522 | 1/1980 | Ritchie | 280/278 |
| 4,448,437 | 5/1984 | Montague . | |
| 4,579,360 | 4/1986 | Nishimura et al. . | |
| 4,598,923 | 7/1986 | Csizmadia | 280/287 |
| 4,824,130 | 4/1989 | Chiu . | |
| 4,900,047 | 2/1990 | Montague et al. . | |
| 4,995,626 | 2/1991 | Montague et al. . | |
| 5,135,246 | 8/1992 | Montague . | |
| 5,222,751 | 6/1993 | Chen . | |
| 5,282,639 | 2/1994 | Chen | 280/231 |
| 5,398,955 | 3/1995 | Yeh | 280/287 |
| 5,487,442 | 1/1996 | Hua | 180/220 |

FOREIGN PATENT DOCUMENTS

| | | | |
|---|---|---|---|
| 2038816 | 3/1971 | Germany | 280/287 |
| 4207771 | 9/1993 | Germany | 280/287 |

*Primary Examiner*—Lanna Mai
*Assistant Examiner*—Avraham H. Lerner
*Attorney, Agent, or Firm*—Sughrue, Mion, Zinn, Macpeak & Seas, PLLC

[57] ABSTRACT

A foldable bicycle designed so when the bicycle is folded, the front and rear frames bypass each other (non-overlapping) to permit a complete folding position and using a fold on or near the seat tube, and to maintain a rigid open riding position with simple standard fold restraining devices.

41 Claims, 8 Drawing Sheets

FOLDING FRAME BICYCLE

I. BACKGROUND OF THE INVENTION

A. Field of the Invention

This invention relates to a foldable bicycle that folds on or near the seat tube having non-overlapping front and rear frames and using quick release clamps or other means to lock a front and a rear frame together in the open riding position. In this application, the term "quick release" or other locking devices are referred to as restraining devices.

B. Prior Art

Many folding bicycles such as the Dahon, U.S. Pat. No. 4,067,589, require many folding steps while setting the folding axis in the middle of the structural members making a bicycle that is too complicated to fold and structurally weak. To date the strongest folding bicycles have been those that fold about the seat tube using a minimum number of quick release levers. U.S. Pat. No. 4,448,437 and U.S. Pat. No. 4,900,047 define a fold about the seat tube construction, with the rear member collared about the front member and the seat post attached to the front member.

Other bicycles, such as the Bridgestone "Grandtech", U.S. Pat. No. 4,579,360, employ the fold about the seat tube concept and involved only a few steps to fold the bicycle but had to sacrifice the strength of the open bicycle by distorting the seat post to achieve the limited number of folding steps. Likewise, U.S. Pat. No. 5,222,751 uses the concept defined in U.S. Pat No. 4,448,437 by having the same bottom bracket area collar as shown in FIG. 2B of U.S. Pat. No. 4,448,437. The design has a collared bent seat tube attaching a front and a rear frame, at the bottom near the crank and at the top near the seat tube.

All of these bicycles and tandems, including the prior configurations of the present inventor, had front and rear frames that partially or completely overlapped each other. U.S. Pat. No. 4,448,437 shows both the condition where the front frame surrounds the rear frame and where the rear frame surrounds the front frame. The current application has the front and rear frames partially overlapping. U.S. Pat. No. 4,579,360, Bridgestone's "Grandtech" has the back frame surrounding the front frame and U.S. Pat. No. 5,222,751 has the two frames overlapping.

There are however still areas for design improvement, to reduce the number of components, to increase strength of the frame and to enhance and simplify the folding operation. In this application a novel non-overlapping frame design of this invention has neither the front nor the back frame overlapping the other. The hinge points or restraining points may project into the opposite frame area but they are not the basic mass of the distinct frames. There are no other folding bicycles or tandems with non-overlapping back and front frames. There have been many recumbants and bicycles designed with a continuous single bar running from the head set to the back wheel axle, those that folded had a door type hinge in the middle, creating overlapping frames when folded. None of these had non-overlapping front and rear frames.

II. SUMMARY OF THE INVENTION

It is the object of this invention to define a foldable bicycle with hinging means on or near the seat tube and front and rear frames that do not overlap and have locking elements joining these frames together in the open position. Either the front or the rear non-overlapping frames can be on top of the other, and the front and rear sections can be built with conventional separate top and bottom tubes, seats and chain stays or solid bars. The attachment/rotation points can be in front, on or in back of the seat tube, angled or not so the front wheel can stay on or off in the folded package. At the attachment point either the front or rear frame seat tube member can be collared over the other. The hinging point can be combined with the restraining point or they can be switched around replacing each other.

These alternatives can all be applied to any frame or wheel size, from the smallest child's bicycle up to the largest adult bicycle. The rear frames may be extended to hold a child's seat or the concept may be used to form a tandem that folds in the middle. The availability of light weight strong materials now permits the replacement of top and bottom tube members with a single member. In previous conventional non-folding X frames, a continuous bar was used from the front head set back to the rear wheel drop out. In the "modified X" shape of this invention, the continuous bar is cut in two, one half set above the other, so the bicycle can be folded.

When the bicycle is folded the front and rear frames bypass each other (non-overlapping) to permit a complete folding position. The bicycle frame is generally comprised of two main sections, one of which extends from the head tube back to the seat tube area, and one of which extends from the seat tube area back to the rear wheel center. There are seven variable geometric configurations and aspects of this novel non-overlapping geometry: 1) Either the front or the rear frame may be on top of the other section but normally the front frame will be above the back frame; 2) The front or rear sections of the bicycle may be made of hollow oval or rectangular bars or open shapes formed of tubes or any combination thereof; 3) Either the front or the rear frame hinge member may be collared over the other hinge member at the hinge point making up a concentric hinge rotation; 4) The hinge point of the fold may be in the front, on, or in back of the seat tube position; 5) The angle of the folding hinge may be changed to allow the folded package to have the front wheel left on or off; 6) The position of the hinging and the position or positions of the restraining devices maybe interchanged for any and all possibilities, and the hinging device may also be a securing device and vice versa. If the hinging and securing devices are combined and used to draw the frames together in the riding position, then the other remote restraining devices can be no more than pins or wedges; and 7) The bicycle may be a tandem incorporating any and all of the above variations. There is nothing in the uniqueness of this design that restricts it from being used with different frames and wheel sizes from the smallest child's bicycle up to the largest adult bicycle.

This invention will be described in greater detail by referring to the attached drawing and the description of the preferred embodiments which follows.

BRIEF DESCRIPTION OF THE DRAWING

FIG. 5 is a side view of a portion of a non-overlapping frame for a bicycle, as a modification of the first preferred embodiment, with bar front and rear sections hinged at an angle, in front of the seat tube so in the folded package the front wheel would stay on;

FIG. 6 is a side view of a portion of a non-overlapping frame for a bicycle, as a modification of the first preferred embodiment with bar front and rear sections, hinged vertically at the seat tube with the front tube collared over the rear tube and the main restraining device at the seat tube;

DESCRIPTION OF THE PREFERRED EMBODIMENTS

Figures 1, 2:
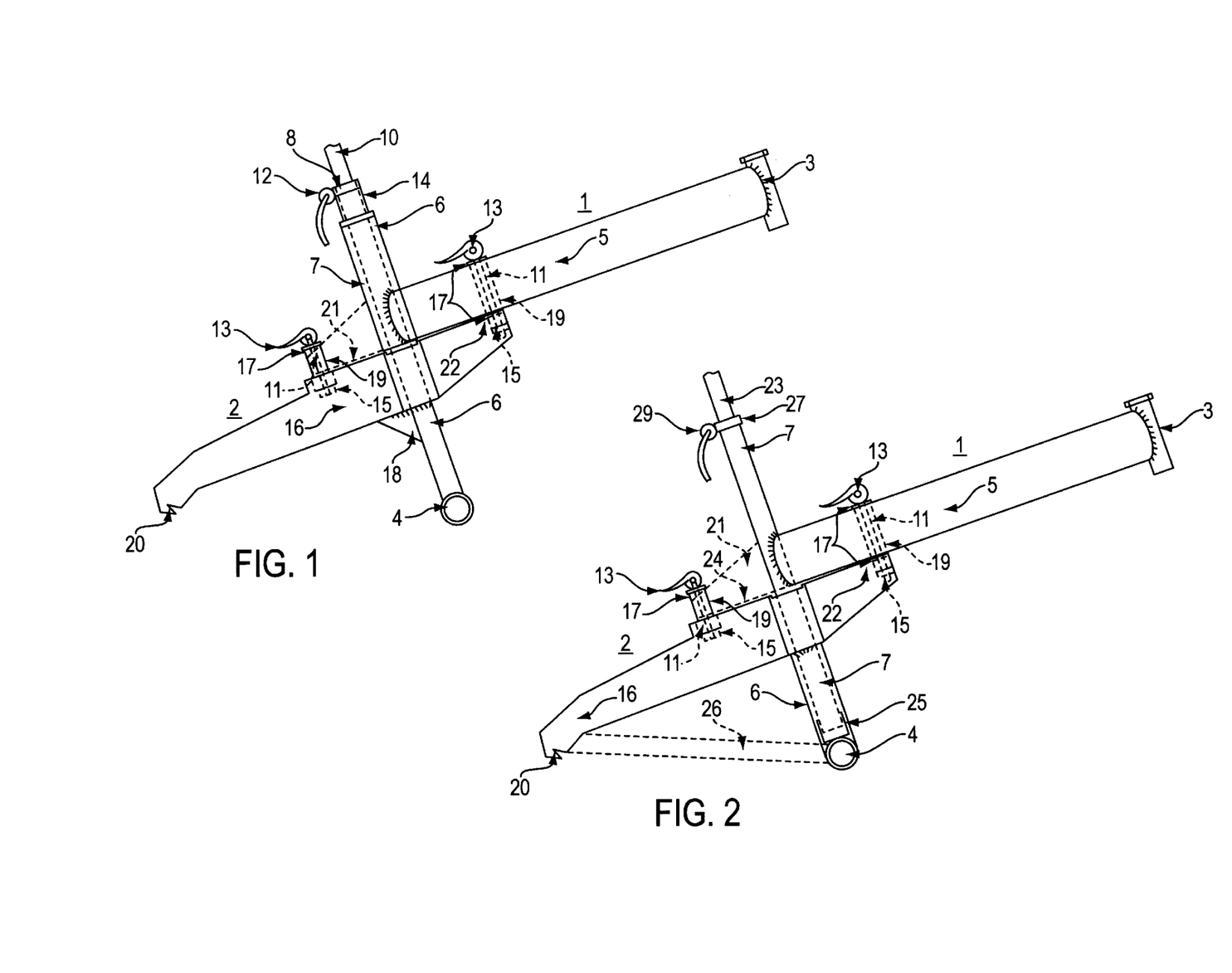
FIG. 1 is a side view of a portion of a non-overlapping frame for a bicycle in accordance with a first preferred embodiment of this invention having bar front and rear sections, hinged vertically at the seat tube with the front section collared over the rear.
FIG. 2 is a side view of a portion of a non-overlapping frame for a bicycle, as a modification of the first preferred embodiment with bar front and rear sections, hinged vertically at the seat tube with the rear section collared over the front.

In the preferred embodiment and all the following embodiments, the numbers designating the front frame components are odd numbers and the numbers designating the rear frame components are even numbers. Referring now to FIG. 1 a first preferred embodiment is illustrated. It is made up of a solid bar front frame above a solid bar rear frame, with the L-shaped front frame collared around the T-shaped rear frame which is made up of a bar set perpendicular to the seat tube. The hinge point is at the seat tube point, and is hinged vertically for the removal of the front wheel. The securing device is shown in front of the seat tube and there is an option for another hinge to the rear of the seat tube. This solid bar construction with the front frame set above the rear frame forms a unisex "modified X' frame design.

In this preferred embodiment the L-shaped front frame is a bar with a seat tube attached at the end. This seat tube is collared over a smaller diameter seat tube which is part of the T-shaped rear frame. The back frame may incorporate a set of stays running between the crank housing and the rear axle or additional bracing between the seat tube and the bottom of the rear bar. Between the inner and outer seat tubes is a long non-metallic collar which makes the rotation easier. The non-metallic collar which permits the use of softer light weight metals for the bicycle such as aluminum. There is nothing, however, that prevents the use of the standard steel used on most bicycles, or composites, fiberglass or any other material in this design.

Referring now to FIG. 1 the basic rigid bar frame configuration of non-overlapping, uni-sex, "modified X" frame hinged vertically at the seat tube with the L-shaped front frame collared on the back frame. In FIG. 1, the front frame member 1 is comprised of a head tube 3, a top-bottom tube combined in a single bar 5, a seat tube 7 welded to 5, a restraining rod 11, with an eccentric lever arm 13 at one end and an adjustable knob 15 at the other end, top and bottom washers 17, and a rod housing 19. Bar 5 can be extended on the other side of the seat tube and have a bar 21, with the same kind of restraining rod 11, and the eccentric 13, etc.

In FIG. 1, the rear frame member 2 is comprised of a crank housing 4 attached to the seat tube 6, extending up inside the front frame's outer tube 7. Attached to the top of the seat tube, is a slotted ring 8, which is squeezed down on the seat post 10, by means of a quick release 12. The end of the seat tube 6 is threaded and the thread collar 14 is used to tighten the front frame down on the rear frame. The seat tube 6 is attached to a rear bar 16 and a corner brace 18. At the rear of the bar stays 16 are the rear wheel dropouts 20. There is an extended part of the rear frame bar stays 16, labelled 22 which is positioned in front of the seat tube 6 and combines the divided seat stays into a single member. All these parts and the front frame members are constructed using conventional bicycle technology for aluminum, steel, composite and resin construction. It is understood but not illustrated, that in addition to those items mentioned, as in a standard conventional bicycle, the front and rear frames house front forks, handle bar stems, handle bars, controls, front and rear wheels, brakes, seats, chains, cranks, pedals, chain rings, front and rear DERAILLEURS, cables, etc.

The folding operation for the first preferred embodiment in accordance with the present invention will now be described. The first step in the folding operation involves releasing the restraining device which squeezes the back and front frames together, by pulling up the lever arm 13 which with its eccentric pressing on the top housing decreases the pressure on the rod 11 and releases the bottom knob 15 from its contact on the extended part of the back frame 22. The rod 11, can then slide out of the slot in the extended part of the back frame. Before this is done, however, the front wheel is removed by releasing the standard front wheel quick releases. With the front wheel off, the front frame 1, can be rotated around, stopping only when the front fork and the back wheel come together. If the back restraining device drawing the front frame extension bar 21 to the rear frame bar 16 were used, it too would have to be released in the same manner as the front restraining device.

The collaring of the first preferred embodiment could be reversed and the rear frame collared over the front frame. In FIG. 2, the outside collar would be attached to the rear frame below the bottom line of the front frame. In both cases the crank housing is, of course, attached to the rear frame. In the preferred embodiment the seat post slides into the rear frame and in the alternative, it is attached to the front frame. In the preferred embodiment there is an outside collar threaded onto the inner seat tube which can be tightened to draw the two frames together. Alternatively, collaring the rear over the front, this threaded collar can be set inside the other seat tube.

In this first preferred embodiment, a restraining device is run down to catch the extension of the rear frame. This restraining device can be comprised of a rod with a lever at the top above the front frame bar and a knob at the bottom which lever when tightened, draws the front and rear frame bars together when the bicycle is in the riding open position. This tightening torque can be achieved using a standard bicycle quick release lever and the knob is to adjust the length of the rod. In this preferred embodiment, it is this single device which locks the front and rear frames rigidly together. The collaring of the two frames is, of course, tightened and preadjusted by the threaded collar-nut at the top of the seat tube. Another of these restraining devices could be used behind the seat tube for the strongest off-road type bicycles or as shown in the tandem option.

Referring now to FIG. 2, the basic rigid bar frame configuration of a non-overlapping, uni-sex, "modified X" frame, this time with the rear frame collared on the front frame. In FIG. 2, the front frame member 1 is comprised of a head tube 3 and a top-down tube combined in a single bar 5, and a seat tube 7, which extends up to the seat post 23 (a new number because it is now attached to the front frame) and down to just above the crank housing, but not attached to as it has an interior threaded collar 25 that forces the two frames together. This seat tube is welded to the front bar 5, and has a restraining rod 11, with an eccentric lever arm 13 at one end, and an adjustable knob 15 at the other end, top and a bottom washers 17, and a rod housing 19.

In FIG. 2, the rear frame member 2 is comprised of a crank housing 4, which is attached to the seat tube 6 and extends on up to just below the bottom of the front frame bar 5. The seat tube 6 is welded to the chain stay combination bar 16, on the back side, and the rear frame bar extension 22, on the front side. The rear frame bar which could have a separate chain stay 26, has rear dropouts 20, at its end. All these parts and the front frame members are constructed using conventional bicycle technology for aluminum, steel, composite and fiber glass construction. It is understood but not illustrated, that in addition to those items mentioned, as in a standard conventional bicycle, the front and rear frames house front forks, handle bar stems, handle bars, controls, front and rear wheels, brakes, seats, chains, cranks, pedals, chain rings, front and rear DERAILLEURS, cables, etc.

It is understood that the first preferred embodiment of both FIG. 1 and FIG. 2 can have the front frame bar extended back to section 21, and can use a similar restraining device as used on the extension of the rear frame bar. This double restraining bar system could be used on rugged off-road bicycles, on bicycles that have additional loads such as a child's seat with an extended rear frame or on folding tandems, FIG. 9, with an even more extended rear frame bar but which would fold similar to the regular bicycle.

Figures 3, 4:
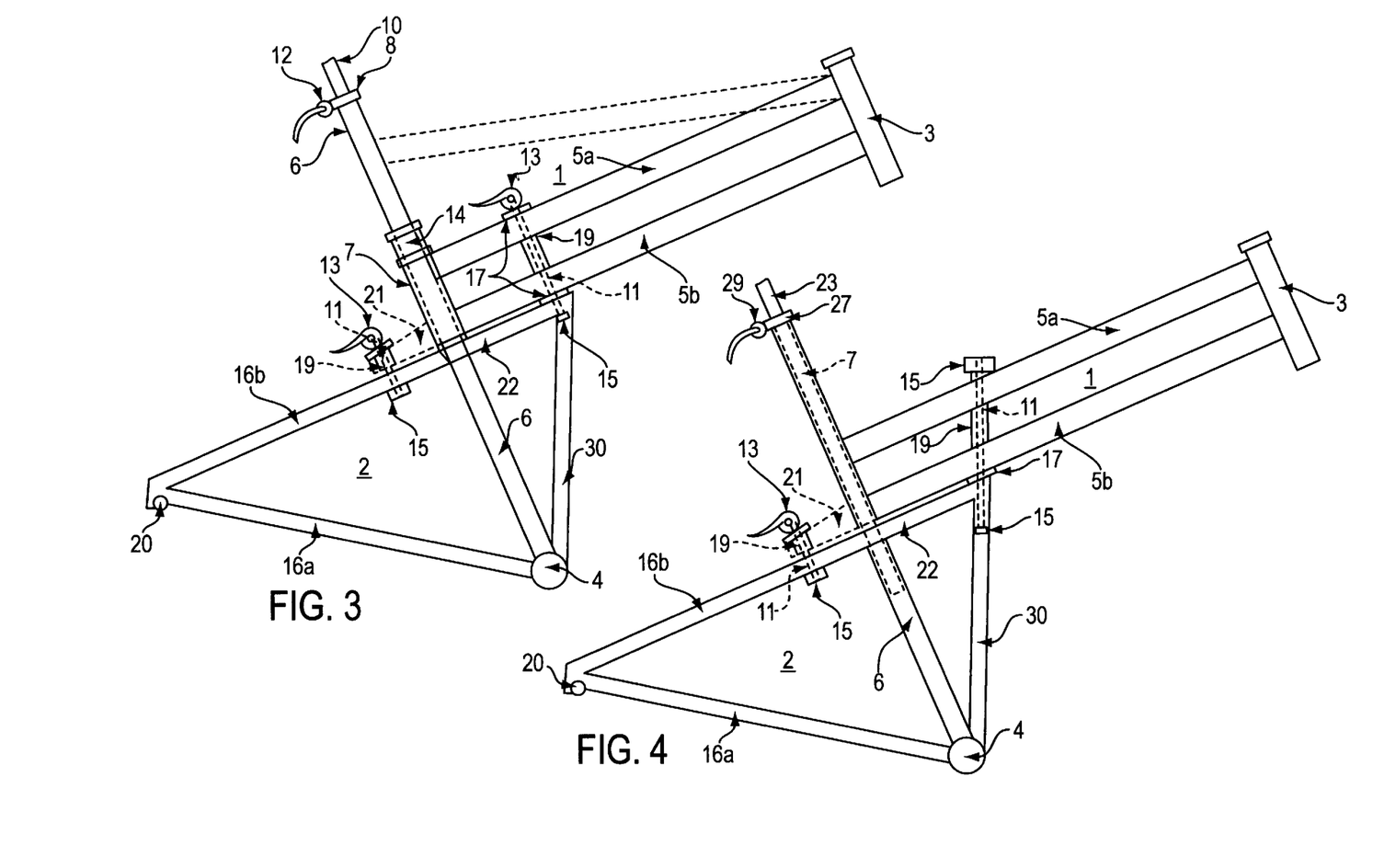
FIG. 3 is a side view of a non-overlapping frame for a bicycle, in accordance with the first preferred embodiment, with open frames both front and rear, hinged vertically at the seat tube, with the front frame collared over the rear frame. Not shown in this figure is the alternative where the rear frame collars over the front frame.
FIG. 4 is a side view of a non-overlapping frame for a bicycle with open frames both front and rear, with the top tube dropped to a lower position, and hinged at an angle in front of the seat tube, with the front frame collared around the rod of the rear frame rod.

In FIG. 3, the open frames, front and rear, are collared at the seat tube, with the front frame seat tube collared over the rear frame seat tube. Referring now to FIG. 3, the basic rigid open configuration of a non-overlapping frame with a vertical pivot point at the seat tube, showing the front seat tube concentric about the rear seat tube. An alternate to the open frame design of FIG. 3 would be to have the rear frame seat tube concentric about the front frame seat tube. The front and back frames are constructed of standard open welded tubes. Another alterate would be to have the top tube raised up to form a man bicycle as shown dotted. The front frame 1 is comprised of a head tube 3, a top tube 5a, a lower tube 5b and a seat tube 7, a restraining rod 11, with an eccentric lower arm at one end 13, and an adjustable knob 15 at the other end, top and bottom washers 17 and a rod housing 19. The front frame can be extended behind the seat tube 7, with an extension 21 and the same restraining device set up. The rear frame 2 is comprised of the seat post 6, with crank housing 4, chain stays 16a, rear wheel drop out 20, seat stays 16b, which can be extended past the seat post 6 and brought together, and member 22, and member 30 attach to the front frame restraining device.

The construction and components are all standardized as mentioned in FIG. 1 and FIG. 2, as is the folding process. The collaring of the seat tubes as shown in FIGS. 1 and 2, can be reversed to provide another alternate to FIG. 3.

FIG. 4 is an open frame, woman's type design, with a vertical hinge point in front of the seat tube allowing the folded package to have the front wheel left on.

Referring now to FIG. 4, the rigid open configuration of a non-overlapping frame with an angle pivot point in front of the seat tube so the front wheel can stay on. The front and rear frames are again made up of standard open welded tube construction. The front frame 1 is comprised of a head tube 3, a lowered top tube 5a a down tube 5b, and a seat tube 7. At the top end of the seat tube 7 is a seat post 23 and a quick release collar 27 with the quick release 29 to tighten it. The seat post 23 can be extended down into the lower seat tube 6, to act as an additional restraining device. A collar 19 is set at an angle pivot point and runs in between the top and bottom tubes. Inside the tube is a rod 11 with adjustable nuts, both top and bottom, holding the front and rear frames together. This pivot point can be balance by the top and bottom nuts or a quick release can be set at the top to loosen the pivot point if necessary. The pivot point can be vertical as an alternate folding design to permit the front wheel to be taken off when folding. The rear frame 2 with a seat post 6, a crank housing 4, chain stays 16a, rear wheel drop out 20, seat stays 16b and front extension 22 connected diagonally to brace 30. The construction and components are all standard as mentioned in FIGS. 1, 2 and 3, as is the folding process.

Figures 5, 6:
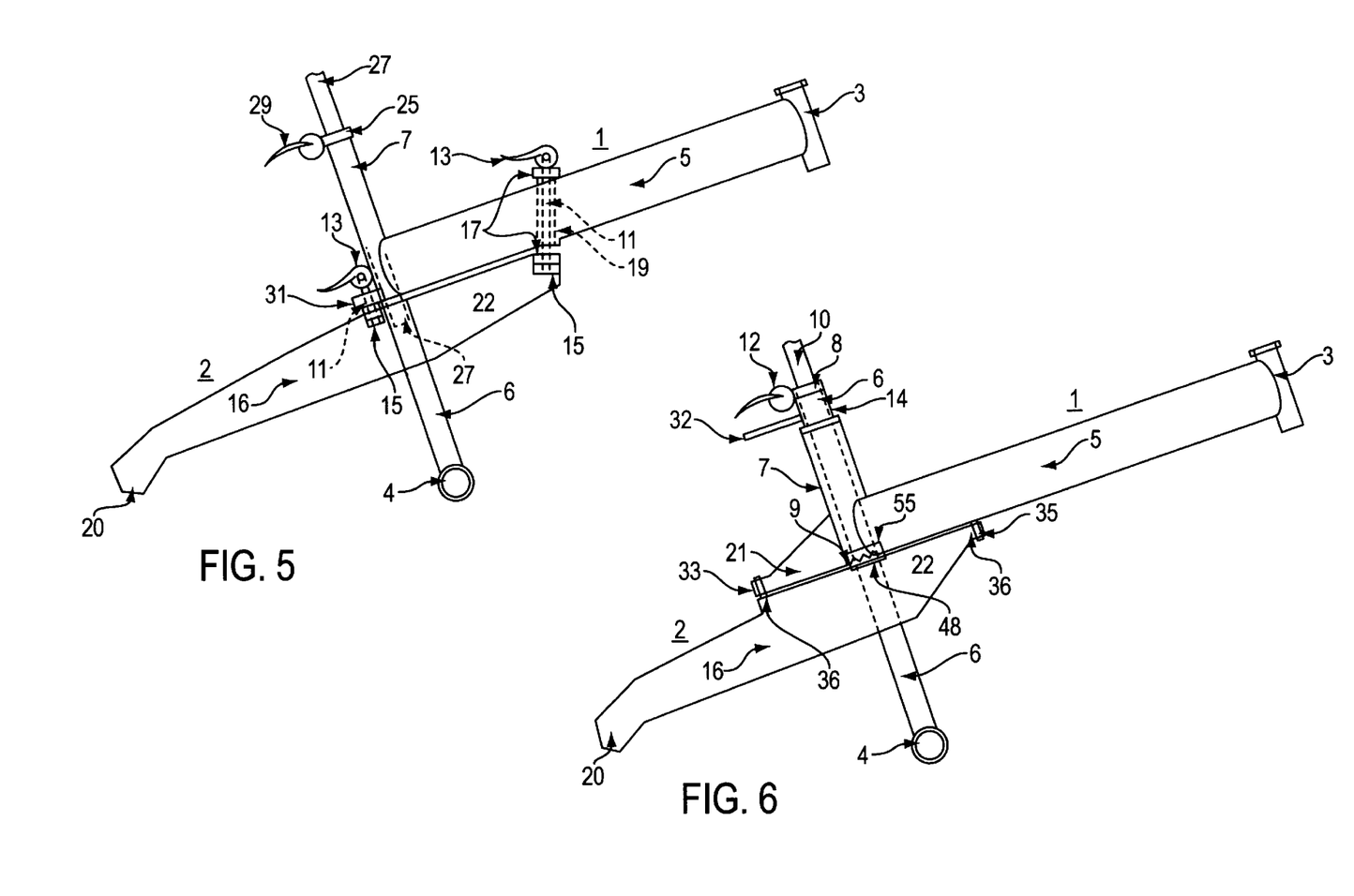

In FIG. 5, the front and rear bar frames are joined with a restraining device at the front of the seat tube at an angle and to the rear of the seat tube, the seat post also projects into the rear frame from the front frame. If the quick releases are loosened and the seat tube removed, the two sections can come completely apart. This configuration does not involve hinging but employs separation of the front and rear frames as permitted by their respective connecting cables. If a hinge design was desired, rod 11 would extend to the bottom of the rear member 22 and be collared within that member.

Referring now to FIG. 5, the rigid bar frame construction of non-overlapping, uni-sex, "modified X" frame hinged at an angle in front of the seat tube. In FIG. 5, the front frame member is comprised of the head tube 3, a top-down tube combined 5, a seat tube 7 welded to 5, a restraining rod 11, an eccentric lever arm 13 and adjustable knob 15, washers 17, collar tube 19, bar extension 31, rod 11, nuts 15 and quick release 13. The seat tube 7 is capped with collar 25, seat post 27 and quick release 29. The seat post can be extended down to a pocket within the back frame to prevent folding. In FIG. 5, the rear frame member 2 is comprised of a crank housing 4, attached to seat tube 6, extending on up to just below the bottom of the front frame bar 5. The seat tube 6, is welded to the rear frame bar 15, and the extension bar 22. Since neither one of the frame sections are collared during the folding process the front and rear frames separate and can be positioned in the smallest folded configuration. The construction and components are all standard as mentioned before as is the folding process.

FIG. 6 is similar to FIG. 1 except that it uses the threaded collar at the top of the seat tube as the sole means to draw the front and rear frames together. Toothed rings are placed on the seat tube where the two frame sections come together. Non-tightening restraining pins or slots are placed in front and/or in back of the seat tube to also resist the turning moment when the bicycle is being ridden.

Referring now to FIG. 6, the rigid bar frame construction of non-overlapping, uni-sex, "modified X" frame hinged vertically at the seat tube with the L shaped front frame collared on the back frame. FIG. 6 is the same as FIG. 1 with the front frame comprised of a head set 3, front bar 5, seat tube 7, and a similar rear extension 21. The rear frame is comprised of the crank housing 4, seat tube 6, extended through the front frame collar up to seat post collar 8, seat post 10, and quick release 12. The end of the seat tube is also threaded and the thread collar 14 is used to tighten the front frame down on the rear frame. In FIG. 6, however, the tightening down process is used as a main restraining device and is released with the turning of lever 32 every time the bicycle is folded and unfolded. This drawing together process of the two frames can used to pull together simple pins or slots located at external positions from the seat tube. In the front of the seat tube, pin 35, attached to the front frame, is housed in the pin holder 36 attached to the rear frame. In back of the seat tube, pin 34, attached to the rear frame, is housed in pin holder 33 attached to the front frame. At the seat post where the two frames are in contact there could also be a ring of teeth, 55 attached to the top frame and 48 attached to the lower frame. These rings would supplement the friction of the contact points of the two frames and resist any turning forces. The construction and components are all standard for FIG. 6 as mentioned before.

Figure 7:
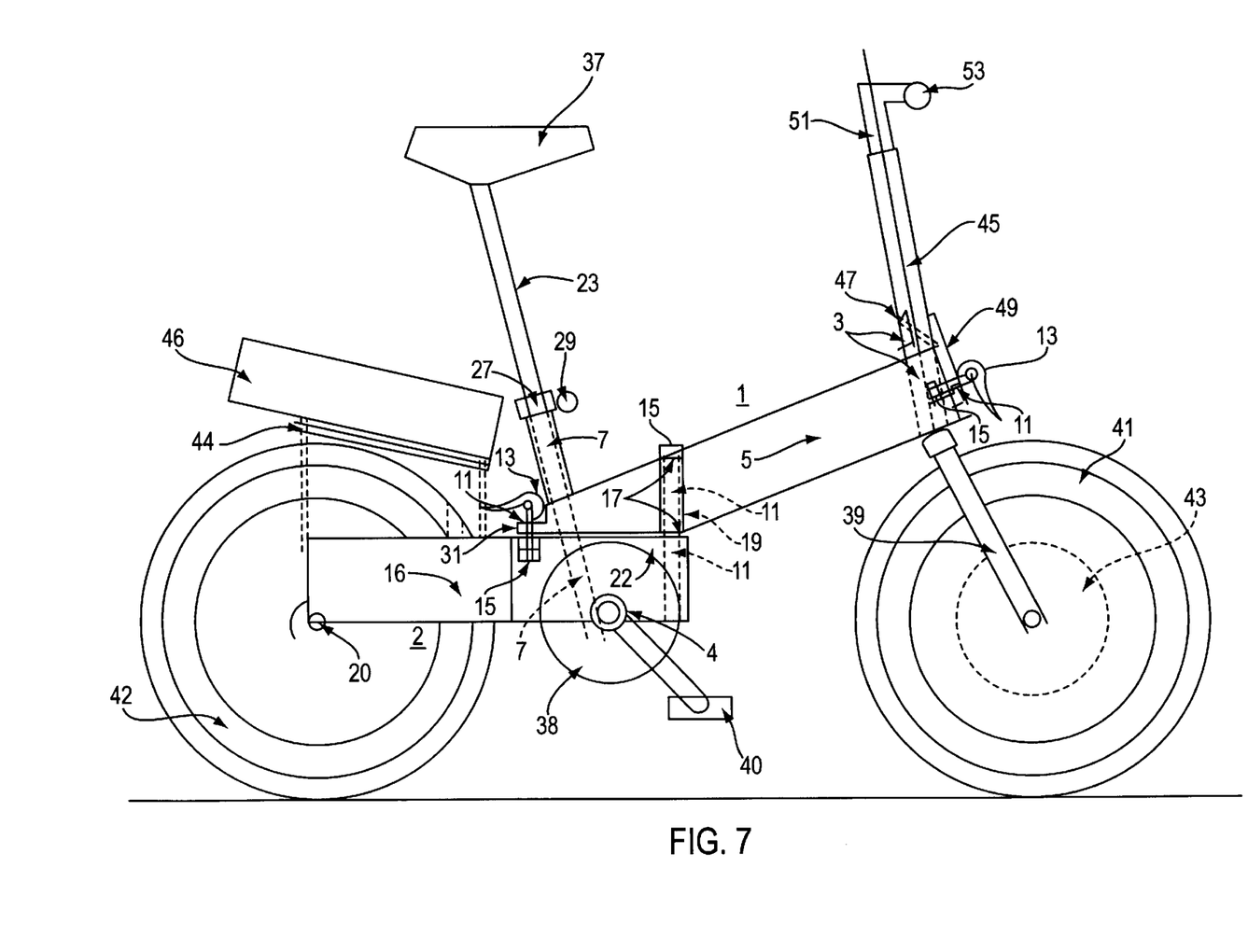
FIG. 7 is a side view of a small wheel non-overlapping frame bicycle in accordance with a first preferred embodiment of this invention, with bar front and rear sections hinged at an angle in front of the seat tube.

FIG. 7 is the similar to FIG. 5 except that it is for a small-wheel folder, and does not have a take-apart design but has a hinge in front of the seat tube permitting rotation of the two frame sections for the folded package. As in the case of other small-wheel folders, it has a fold-down headset and handle bars. FIG. 7 shows a front wheel electric motor option with a rear rack and battery for this option.

Referring now to FIG. 7, a rigid bar frame construction of a small wheel non-overlapping uni-sex, "modified X" frame, hinged at a point in front of the seat post at an angle to the front frame bar so the front wheel remains on during the folding process. FIG. 7 is similar to FIG. 5, only the geometry has been adapted to a small wheel folder. The front frame 1, is comprised of a head tube buried within a front frame bar 5, a restraining rod 11, in a sleeve 19 with washer 17, a nut 15 at the top, the front frame bar 5 welded to the seat tube 7, a seat post collar 27, a seat post 23, a seat 37, a clamp with quick release 29, a rear bar extension 31, and a quick release 13. The front fork 39 holds the front wheel 41 and an optional front wheel motor 43. The extended head tube 45 is hinged at hinge 47 and has a restraining plate 49 welded on to it. This plate is secured into a slot in the front frame for the nut 15, attached to the rod 11, tightened by the quick release 13. The slot is angled to receive the pin 11, and nut 15 which return to it at an angle caused by the angle of the hinge 47.

The rear frame 2, of FIG. 7 comprises a crank arm and pedal 40, attached to a crank housing 4, set in front of the seat tube axis, set within the rear bar 16, which holds the rear wheel drop outs 20, the rear wheel 42, and a rear rack 44, which holds an optional motor battery 46. The construction and components are all standard, the folding process front wheel stays on, the front head set quick release is loosened, the head set 45, and the head stem and handle bars 53 hinge down at an angle so they remain flat against the side plane of the front frame bar 5. When the extended rear bar 31's quick release 13 is released, and the seat post 23 is removed and the bicycle is folded, the front bar 5 comes up against the rear rack and battery.

Figures 8A, 8B:
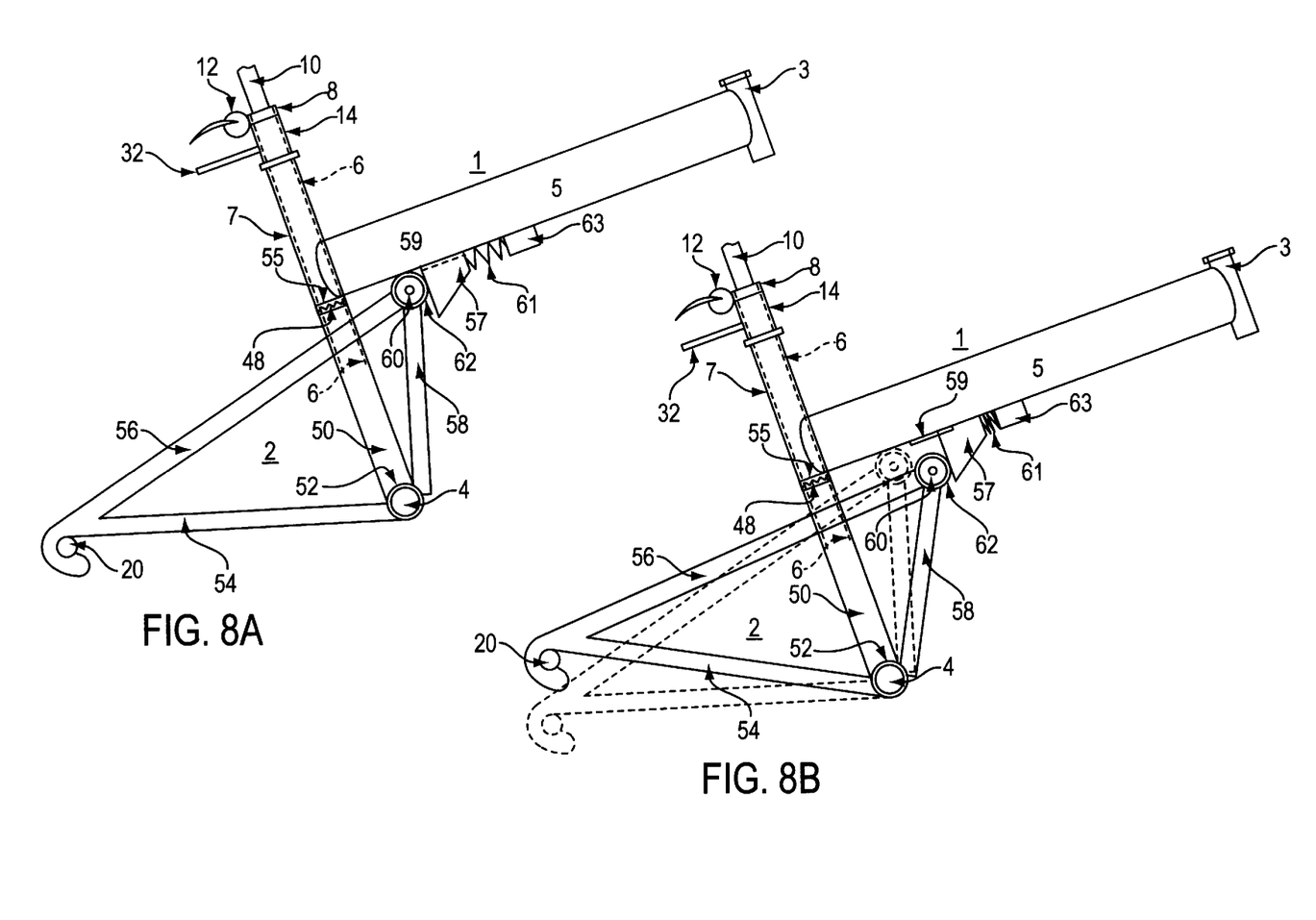
FIG. 8a is a side view of a full suspension, non-overlapping frame for a bicycle, in accordance with a second preferred embodiment with a bar front section and an open rear section, hinged vertically at the seat tube with the front collared over the rear and an additional restraining device at the seat tube.
FIG. 8b is the side view of the same bicycle showing the rear suspension fully compressed.

FIGS. 8a and 8b illustrate the two extreme positions of the rear frame suspension on a full-suspension folding bicycle in accordance with a second preferred embodiment of this invention. The rear open frame hinges about the crank housing point with a rotating collar. Its suspension is provided by a compression mechanism attached to the bottom of the front frame bar tube. FIG. 8a shows that, in an unloaded state there would be no pressure between the front frame compression mechanism and the rear frame's suspension wheel in contact with that mechanism, assuming that block 57 has travelled as far to the rear as it can go. The restraining device could be released and the suspension wheel moved sideways to start the folding process.

Referring now to FIGS. 8a and 8b, two side views of the same bicycle showing the working positions of the rear suspension system—a rigid front bar frame configuration with a rigid rear open frame used for a non-overlapping, uni-sex, "modified X" frame hinged vertically at the seat tube. The front frame of FIGS. 8a and 8b are very similar to the front frame of FIG. 6. The head tube 3, front bar 5, seat tube 7, and teeth ring 55 are the same. The rear frame is comprised of the seat tube 6 with, at the top, the same restraining threaded device used in FIG. 6, a threaded collar 14, a handle to turn it 32, a seat post collar 8, a seat post 10, and a quick release 12. The seat tube 6 is welded to the teethed ring 48 and its continuation tube 50. Seat tube 50 is the same member as seat tube 6 only it has a wider diameter for appearance reasons. It extends down to the crank housing 4 and creates a rigid construction by being welded to the crank housing. Around the outside of the crank housing and at its side is a rotating sleeve 52. Attached to this sleeve is an open rear frame consisting of chain stays 54, a rear wheel drop out 20, seat stays 56, and the third leg of the triangle, struts 58. Stays 56 which bypass the seat tube on each side and stays 58 are rigidly joined at a cylinder 60 which has a wheel rotating around it.

The suspension system components of the front frame consist of a moving block 57 on the bottom of bar 5, a moving block 57, held and guided on a guide rail 59, and pushing against a spring 61 or shock absorber, in turn pushing against a fixed block 63. FIG. 8a shows the spring/shock in the open position. FIG. 8b shows the spring/shock in the closed position which occurs when an upward force is applied to shock the bicycle and the back of the rear frame rises up. FIG. 8b shows the back raised up and in dotted lines, the position of FIG. 8a. As the rear frame moves from the position of FIG. 8a to that of FIG. 8b, the rotating wheel 62 moves across the surface of moving block 57 compressing spring 61. In FIG. 8a, there is no pressure between the wheel 62 and moving block 57 so the rear frame can be unlocked and rotated into a folding position. The construction and components are all standard as is the folding process.

Figure 9:
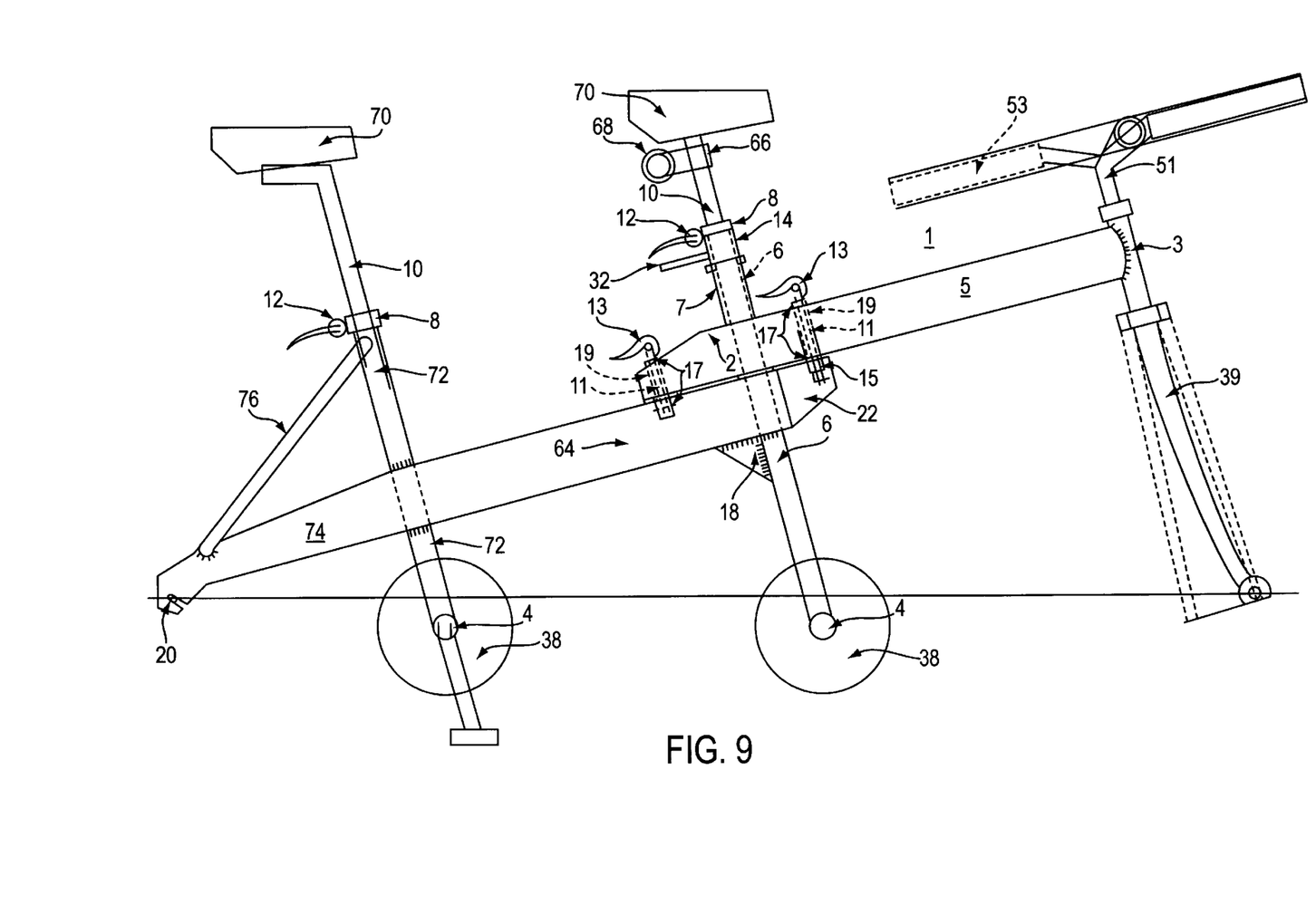
FIG. 9 is a side view of a tandem frame with bar front and rear sections, hinged vertically at the seat tube with the front tube collared over the rear tube and an additional restraining device at the seat tube.

FIG. 9 uses the same three restraining devices shown on the bicycle in FIG. 6 except for the construction of a tandem. The key to the design is the removal of both the front and rear wheels for the folded package.

Referring now to FIG. 9, a basic rigid frame configuration of a non-overlapping, tandem frame with a vertical pivot point at the seat tube and the front L-shaped frame seat tube collared over the rear frame seat tube. In FIG. 9 the front frame member 1 is comprised of a head tube 3, a front bar tube 5, a seat tube 7, a restraining rod 11, with a knob 15 and a quick release 13, washers 17, a collar 19, a bar extension 21 and the same set of restraining elements as on the front bar. Shown also in the forward and perpendicular side folded positions, are the front fork 39, handle bar stem 51, and handle bars 53. The rear frame has crank housing 4, a chain ring 38, a seat tube 6 welded to brace 18, front extension 22, a rear bar 64, and a threaded collar 14, a handle 32, a seat post collar 8, a seat post 10, a quick release 12, a stoker handle bar stem 66, a stoker handle bar 68, and a seat 70. At the back of tube 64 is a stocker seat post 72, with crank housing 4, chain wheel 38, rear extension bar 74, rear drop out 20, seat stays 76, stoker seat post collar 8, seat post 10, quick release 12 and seat 70. The construction and components are all standard for a tandem. Three restraining devices are used at and on either side of the seat tubes around which the tandem folds when the front and rear wheels and the stoker handle bars are removed along with the seats, the restraining quick releases loosened and the tandem folded in half. From the end of extension bar 21 to the far front of the side turned handle bar is approximately equal to the distance from the front of extension bar 22 to the rear drop 20, approximately 38 to 40 inches.

Figures 10, 11:
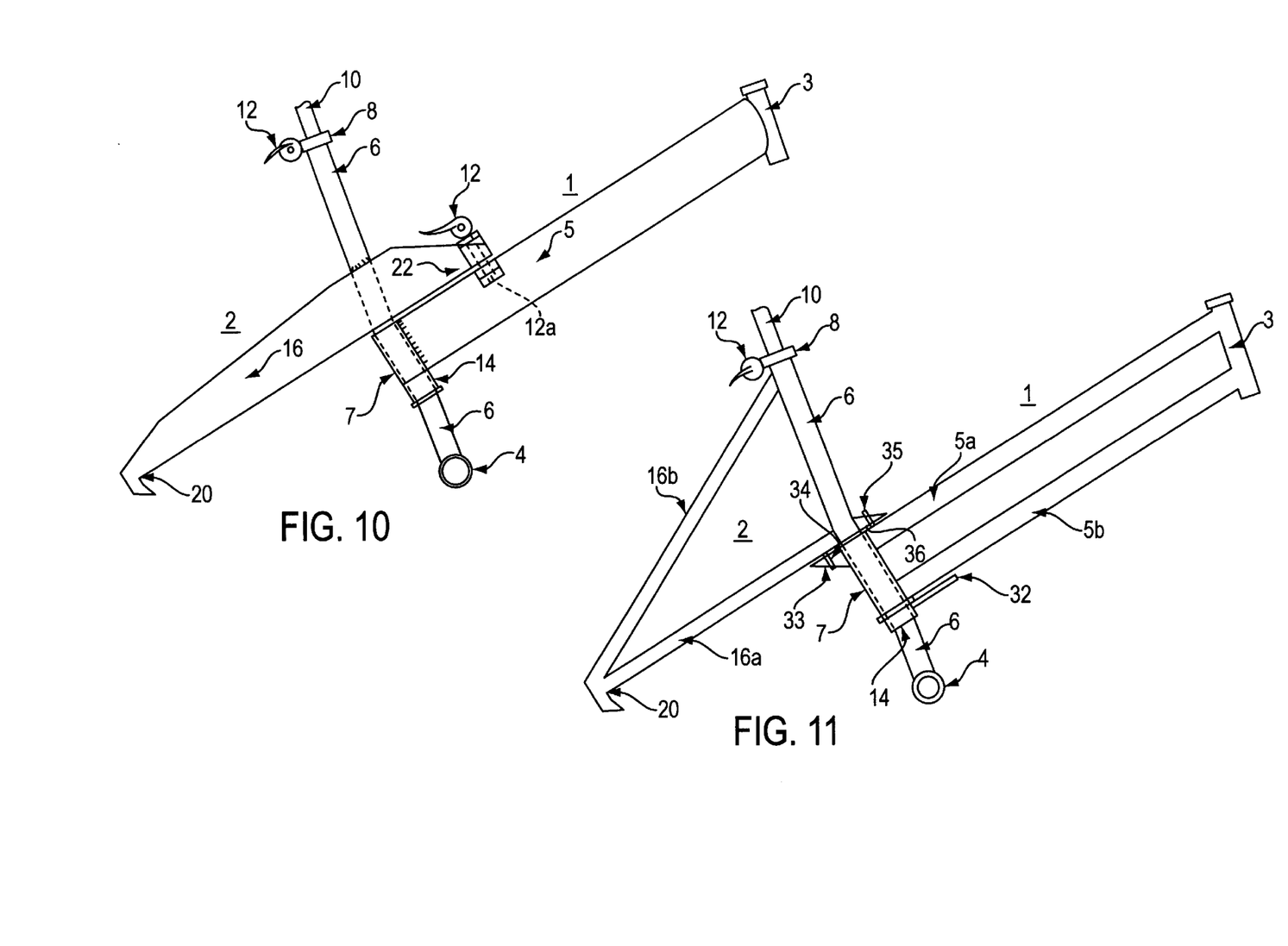
FIG. 10 is a side view of a non-overlapping frame for a bicycle in accordance with a third preferred embodiment of this invention with bar front below a bar rear section, hinged vertically at the seat tube with the front collared over the rear tube and a remote restraining device.
FIG. 11 is a side view of a non-overlapping frame for a bicycle, in accordance with a modification of the third preferred embodiment of this invention with a open front below a open rear section, hinged vertically at the seat tube with the front collared over the rear tube and the main restraining device at the seat tube.

FIG. 10 illustrates the rear frame above the front frame using bar frames front and rear in accordance with a third preferred embodiment of the invention. In FIG. 10 the rigid bar frame configuration of a non-overlapping, uni-sex, "modified X" frame, with the back frame above the front frame, hinged vertically at the seat tube with the bar front frame collared on the back bar frame. In FIG. 10, the front frame member 1 has head tube 3, bar 5, seat tube 7, non-metallic tube 9. The rear member 2, has the crank housing 4, seat tube 6, the threaded collar 14, rear bar 16, rear drop out 20, slotted collar 8, seat post 10, quick release 12. Restraining device has quick release 12, rod and knob 12a.

FIG. 11 illustrates the rear frame above the front frame using open frames front and rear as a modification of the third preferred embodiment. In this Figure the rigid open frame configuration of a no-over-lapping, uni-sex, "modified X" frame, with the back frame above the front frame, hinged vertically at the seat tube with the front frame tube collared over the rear frame tube. In FIG. 11, the front frame member 1 has head tube 3, top tube 5a, down tube 5b, seat tube 7, restraining pins 33 and 35. The rear member 2, has the crank housing 4, seat tube 6, threaded collar 14, handle 32, pin slots 34 and 36, chain stays 16a, rear drop out 20, seat stays 16b, slotted collar 8, seat post 10, quick release 12.

Figure 12:
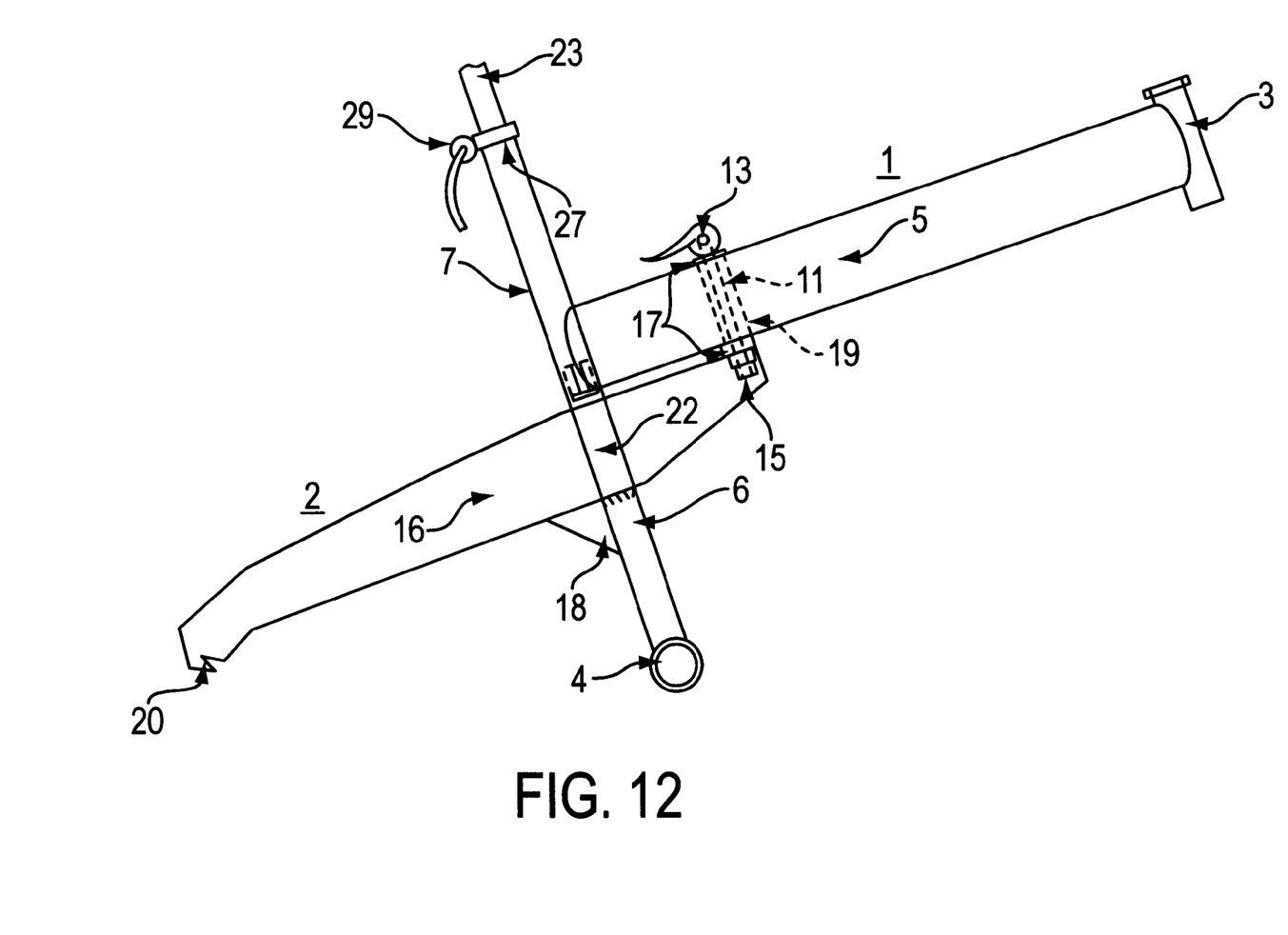
FIG. 12 is a side view of a non-overlapping frame for a bicycle, in accordance with a first preferred embodiment of this invention having bar front and rear sections, hinged vertically at the seat tube with the rear section bolted into the front or vice versa.

Referring now to FIG. 12, a rigid bar frame configuration of non-overlapping, uni-sex, "modified X" frame hinged vertically at the seat tube with the L-shaped front frame bolted onto the back frame. In FIG. 12, the front frame member 1 is comprised of a head tube 3, a top-bottom tube combined in a single bar 5, a seat tube 7 welded to 5, a restraining rod 11, with an eccentric lever arm 13 at one end and an adjustable knob 15 at the other end, top and bottom washers 17, and a rod housing 19. Attached to the top of the seat tube, is a slotted ring 27, seat post 23, quick release 29. At the bottom of the seat tube is a plate 9, threaded to hold the rear frame bolt.

In FIG. 12 the rear frame member 2 is comprised of a crank housing 4 attached to the seat tube 6, extending up inside the rear frame to the top of the rear frame and the plate 10a, holding the bolt 10b. The seat tube 6 is attached to a rear bar 16 and a corner brace 18. At the rear of the bar stays 16 are the rear wheel dropouts 20. There is an extended part of the rear frame bar stays 16, labelled 22 which is positioned in front of the seat tube 6 and combines the divided seat stays into a single member.

It is apparent that other modifications of this invention may be practiced without departing from the scope of this invention.

We claim:

1. A foldable bicycle comprising; a front frame for mounting a front wheel and a rear frame for mounting a rear wheel, said front frame and said rear frame joined in a non-overlapping manner except at folding and fastening points located at or near a main seat tube, said front and rear frames oriented so that when folded each frame can be rotated about a common axis of rotation backward or forward and will not contact a structural member of the other frame, and the front and rear frames are attached and secured together with the bicycle in an operative riding condition.

2. A foldable bicycle of claim 1 wherein said front frame is positioned above a top edge of the rear frame projected forward, and said rear frame is attached to the front frame and secured together when the bicycle is in the operative riding position.

3. A foldable bicycle of claim 2, further comprising a locking mechanism to secure said front and rear frames together, and wherein said front frame and said rear frame are attached together by said locking mechanism but are not hinged and upon releasing the locking mechanism, the front and rear frames can be positioned as desired in the folded position.

4. A foldable bicycle of claim 1 wherein said rear frame is positioned above a top edge of the front frame projected back, and said front frame attached to the rear frame and secured together when the bicycle is in the operative riding position.

5. A foldable bicycle of claim 4 further comprising a locking mechanism to secure said front and rear frames together, and wherein said front frame and said rear frame are attached together by said locking mechanism but are not hinged and upon releasing the locking mechanism, the front and rear frames can be positioned as desired in the folded position.

6. A foldable bicycle of claim 2 wherein said front frame and said rear frame are attached together and folded open by concentric rotation defined by non-intersecting planes of the front and rear frames.

7. A foldable bicycle of claim 4 wherein said front frame and said rear frame are attached together and folded open by concentric rotation defined by non-intersecting of the planes of the front and rear frames.

8. A foldable bicycle of claim 1 wherein at least one of said front and rear frames have a solid bar construction.

9. A foldable bicycle of claim 1 wherein at least one of said front and rear frames have an open tube geometry.

10. A foldable bicycle of claim 6 wherein said concentric rotation occurs in front of the main seat tube position.

11. A foldable bicycle of claim 10, wherein said concentric rotation occurs in an angled position.

12. A folding bicycle of claim 11, further comprising a hinge for said front member to join the separate frames together, said hinge collared over the other frame member.

13. A foldable bicycle of claim 7 wherein said concentric rotation occurs in in back off the main seat tube position.

14. A foldable bicycle of claim 13, wherein said concentric rotation occurs in an angled position.

15. A folding bicycle of claim 14, further comprising a hinge for said rear frame member to join the frames together, said hinge collared over the other frame member.

16. A folding bicycle of claim 1 further comprising an elastic suspension permitting said rear frame to move relative to said front frame.

17. A folding bicycle of claim 13 wherein said front frame further comprises a movable stop block in contact with a portion of said rear frame permitting said rear frame to move in a forward direction relative to said front frame.

18. A folding bicycle of claim 14, wherein said rear frame comprises a hinge with a crank housing to permit rotational movement as said rear frame shifts forward.

19. A folding bicycle of claim 15 wherein said hinge comprises a rotating sleeve coupled to said crank housing and said rear frame, said crank housing being carried by a seat tube.

20. A folding bicycle of claim 3 wherein said bicycle further comprises an alternative electric source of power.

21. A folding bicycle of claim 1 wherein said frame is a tandem frame.

22. A foldable bicycle of claim 2 wherein said front frame and said rear frame are attached together and pivot open and closed about a pin member.

23. A foldable bicycle of claim 4 wherein said front frame and said rear frame are attached together and pivot open and closed about a pin member.

24. A foldable bicycle of claim 22 wherein at least one of said front and rear frames have a solid bar construction.

25. A foldable bicycle of claim 22 wherein at least one of said front and rear frames have a solid bar construction.

26. A foldable bicycle of claim 22 wherein said pivoting rotation occurs at the main seat tube position.

27. A foldable bicycle of claim 26, wherein said pivoting rotation occurs in an angled horizontal position.

28. A foldable bicycle of claim 23 wherein said pivoting rotation occurs in front of the main seat tube position.

29. A foldable bicycle of claim 28 wherein said pivoting axis is vertical.

30. A foldable bicycle of claim 10 wherein said pivoting occurs in an angled horizontal position.

31. A foldable bicycle of claim 10 wherein said concentric rotation occurs in about a substantially vertical position at a point proximate to a mid point between two axle mounts on the frames, and said main seat tube is separated into two portions, an upper seat tube portion directly attached to the front frame and below it and a lower seat tube portion attached to the rear frame, whereby said bicycle is locked in an operable rideable position by an inner seat tube which slides down through the upper front frame and into the lower rear frame, said bicycle seat post positioned inside the inner seat tube and clamping means for clamping together the inner seat tube.

32. A foldable bicycle of claim 26 wherein said concentric rotation occurs about a substantially vertical position at a point at proximate to the mid point between two axle mounts on the frames, and said main seat tube is separated into two portions, an upper seat tube portion directly attached to the front frame and below it and a lower seat tube portion attached to the rear frame, whereby said bicycle is locked in an operable rideable position by the seat post which slides down through the upper seat tube and into the lower seat tube.

33. A foldable bicycle of claim 26 wherein said concentric rotation occurs about a substantially vertical position at a point proximate the mid point between the two axle mounts on said frames, and wherein the main seat tube is separated into two portions, an upper seat tube portion attached to the front frame, and directly and in line below it, and a lower seat tube portion attached to the rear frame, whereby said bicycle is locked in the rideable position by an inner seat tube which slides down through the upper front frame into the lower rear frame, and said bicycle seat post is inside the inner seat tube and clamped together with the inner seat tube using a clamping device.

34. A foldable bicycle of claim 13 wherein said concentric rotation occurs about a substantially vertical position at a point proximate to a mid point between the two axle mounts on said frames in which the main seat tube is separated into two portions, an upper seat tube portion attached to the rear frame, and directly and in line below it, a lower seat tube portion attached to the front frame, whereby said bicycle is locked in the rideable position by the seat post which slides down through the upper seat tube portion into the lower seat tube portion.

35. A foldable bicycle of claim 13 wherein said concentric rotation occurs about a substantially vertical position at a point proximate to a mid point between the two axle mounts on said frames, in which the main seat tube is separated into two portions, an upper portion seat tube portion attached to the rear frame, and directly and in line below it, a lower seat tube portion attached to the front frame, whereby said bicycle is locked in the rideable position by an inner seat tube which slides down through the upper front frame into the lower rear frame, and said bicycle seat post is inside the inner seat tube and clamped together with the inner seat tube using a quick release or other clamping device.

36. A foldable bicycle of claim 28 wherein said concentric rotation occurs about a substantially vertical position at a point proximate to a mid point between the two axle mounted on said frames, said main seat tube separated into two portions, an upper seat tube portion attached to the rear frame, and directly and in line below it, a lower seat tube portion attached to the front frame whereby said bicycle is locked in the rideable position by the seat post which slides down through the upper seat tube into the lower seat tube.

37. A foldable bicycle of claim 28 wherein said concentric rotation occurs about a substantially vertical position at a point proximate to a mid point between the two axle mounts on said frame, said main seat tube separated into two portions, an upper seat tube portion attached to the rear frame, and directly and in line below it, a lower seat tube portion attached to the front frame whereby said bicycle is locked in the rideable position by an inner seat tube which slides down through the upper front frame into the lower rear frame, and a bicycle seat post positioned is inside the inner seat tube and clamped together with the inner seat tube using a quick release or other clamping device.

38. A foldable bicycle of claim 31 further comprising means providing a positive retention to hold said seat tube into the lower frame.

39. A foldable bicycle of claim 31 further comprising a collar fastened to said inner seat tube whereby said inner seat tube is prevented from sliding entirely inside said upper seat tube portion.

40. A foldable bicycle of claim 39 in which the seat post fits into the inner seat tube, and a quick release clamping device to hold said seat post in position.

41. A foldable bicycle comprising: a front upper frame having a head tube, an upper seat tube, and a single oversized tube extending between said head tube and said seat tube, a rear frame, said single oversized tube having an outer center rotation tube inserted through it from top to bottom into which an inner center rotation tube of the rear frame fits, said rear frame comprising a lower seat tube, bottom bracket tube, seat stay which extends past the seat tube to attach to the lower inner center rotation tube, a chain stay, and center rotation down tube on which the inner center rotation tube is mounted, said front upper frame pivoting around the inner center rotation tube and the two portions are secured in the open riding position by an inner seat tube inserted through the upper and lower seat tubes.

* * * * *